United States Patent [19]

Mori

[11] Patent Number: 4,531,756
[45] Date of Patent: Jul. 30, 1985

[54] TWO-WHEELED VEHICLE HEAD PARTS ASSEMBLY

[75] Inventor: Masami Mori, Tokyo, Japan

[73] Assignee: Mori Manufacturing Co., Ltd., Tokyo, Japan

[21] Appl. No.: 487,938

[22] Filed: Apr. 25, 1983

[30] Foreign Application Priority Data

Apr. 28, 1982 [JP] Japan .................. 57-61033[U]

[51] Int. Cl.³ .............................. B62K 21/06
[52] U.S. Cl. .................... 280/279; 384/517
[58] Field of Search ............ 280/276, 279, 280; 308/189 A; 384/517, 518, 500

[56] References Cited

U.S. PATENT DOCUMENTS

| | | | |
|---|---|---|---|
| 1,377,123 | 5/1921 | Gnagy | 308/189 A |
| 1,705,281 | 3/1929 | Bott | 308/189 A |
| 3,438,650 | 4/1969 | Jaulmes | 280/279 |
| 3,762,783 | 10/1973 | Hay | 308/189 A X |
| 4,189,167 | 2/1980 | Dubois | 280/279 |
| 4,325,590 | 4/1982 | Perthis | 308/189 A X |

Primary Examiner—Joseph F. Peters, Jr.
Assistant Examiner—Charles R. Watts
Attorney, Agent, or Firm—Alana H. MacPherson; Steven F. Caserza; Richard Franklin

[57] ABSTRACT

A head parts assembly for use in a two-wheeled vehicle such as a bicycle and a motorbike includes a head pipe, a front fork pipe which extends through the head pipe and a pair of ball bearings to support the head pipe and the front fork pipe to be relatively rotatable from each other. The present head parts assembly also includes a self-adjusting mechanism which allows to maintain the head pipe and the front fork pipe in alignment at all times.

8 Claims, 5 Drawing Figures

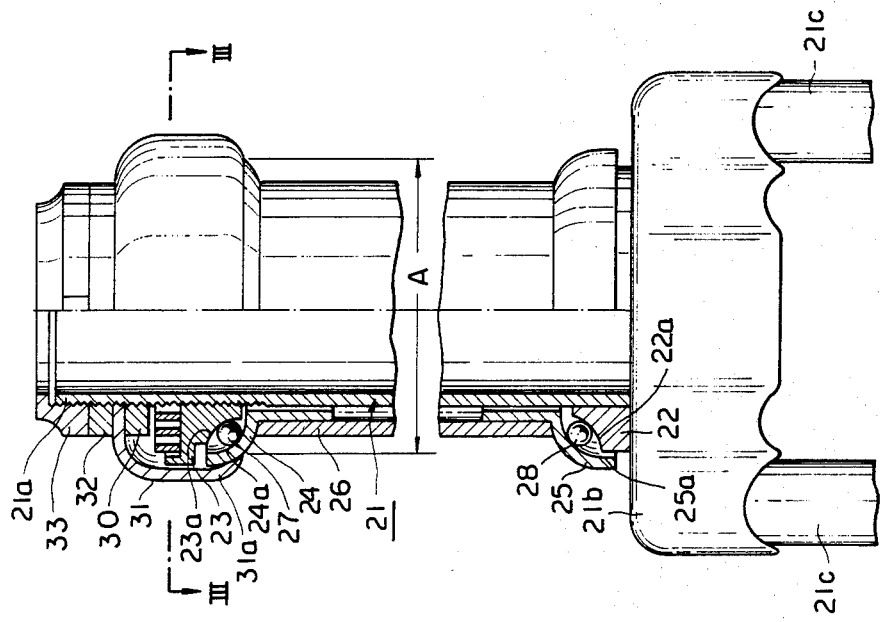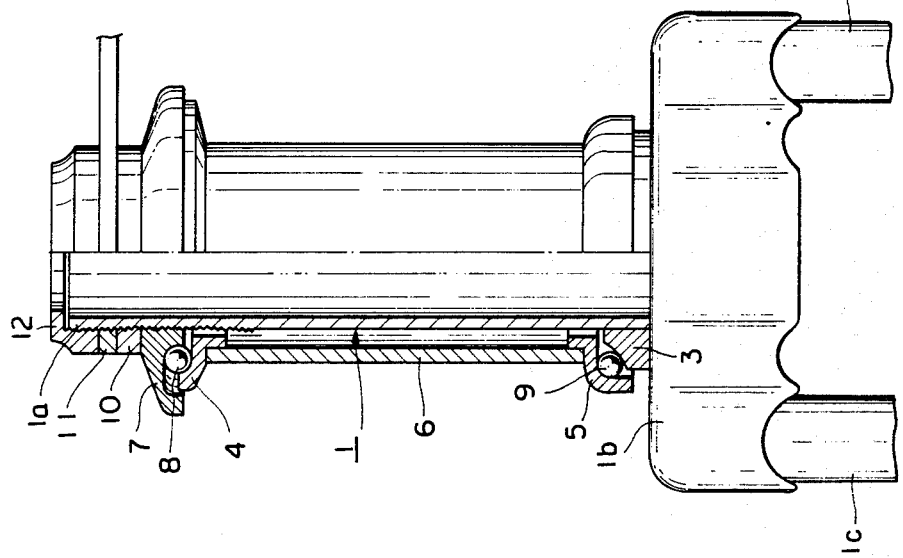

TWO-WHEELED VEHICLE HEAD PARTS ASSEMBLY

BACKGROUND OF THE INVENTION

1. Field of the Invention

This invention relates to a steering structure of a two-wheeled vehicle such as a bicycle and a motorbike, and in particular to a head parts assembly forming a part of the frame of such a two-wheeled vehicle.

2. Description of the Prior Art

The frame of a bicycle includes a head parts assembly which rotatably supports a front wheel and which is connected to a handle bar through a handle bar stem thereby allowing to direct the front wheel in a desired direction with respect to the frame. Such a head parts assembly, typically, comprises a head pipe which is fixedly connected to the top and down pipes of a frame to be held generally vertically but slightly inclined toward a rider thereby defining a head angle between the head and top pipes. The top pipe is held to be substantially horizontal, and the down pipe extends downwardly at an angle from the head pipe to a bottom bracket of the frame. The head parts assembly also comprises a front fork which includes a front fork pipe, a front fork crown fixedly connected to the front fork pipe and a pair of front fork legs depending downwardly from the crown to rotatably support the axis of the front wheel at their tip ends. The front fork pipe is rotatably housed in the head pipe, and the bottom portion of a handle bar stem carrying a handle bar at its top end is fixedly fitted into the front fork pipe. Thus, the front wheel rotatably supported by the front fork may be directed in a desired direction by having the handle bar stem rotated around its longitudinal axis by the handle bar.

A prior art head parts assembly is typically constructed as shown in FIG. 1. The assembly of FIG. 1 includes a front fork pipe 1 which is provided with a threaded section 1a over a predetermined length from its top end. A bottom outer ring 3 is fixedly fitted onto the bottom end portion of the front fork pipe 1, which is integrally formed with a front fork crown 1b. A pair of front fork legs 1c, 1c extend downwardly from the front fork crown 1b, and although not shown specifically, it should be understood that a front wheel is rotatably supported by the pair of legs 1c, 1c at their bottom ends.

The head parts assembly of FIG. 1 also includes a head pipe 6 which is provided concentrically with and generally houses therein the front fork pipe 1. Although not shown specifically, it should be understood that the head pipe 6 is fixedly connected to top and down pipes in forming a frame. The head pipe 6 is provided with top and bottom inner rings 4, 5 at its top and bottom ends, respectively. A cavity is defined between the opposed curved surfaces of the bottom outer and inner rings 3, 5, and a ball bearing 9 comprised of a plurality of balls and a retainer is provided in the cavity thus defined.

A top outer ring 7 is threaded onto the threaded section 1a of the front fork pipe 1 so that the opposed curved surfaces of the top inner and outer rings 4, 7 define a cavity in which a ball bearing 8 is snugly fitted. With this structure, the head pipe 6 and the front fork pipe 1 are relatively rotatable from each other through the ball bearings 8 and 9, and, therefore, even if the head pipe 6 is stationarily held, for example, by having it integrally connected to top and down pipes of a frame, the front fork pipe 1, together with the crown 1b and the legs 1c, 1c, may be rotated relative to the stationary head pipe 6, for example, by manipulating a handle bar which is integrally connected to the front fork pipe 1 through a handle bar stem having its top end fixed to the handle bar and its bottom end tightly fitted into the front fork pipe 1.

The resistance to rotation of the front fork pipe 1 relative to the head pipe 6 may be adjusted by changing the position of the top outer ring 7 on the threaded section 1a. An intermediate nut 10 is screwed onto the threaded section 1a, and it is tightly screwed against the top outer ring 7 so that the ring 7 may be maintained at a set position through a double nut structure between the ring 7 and the intermediate nut 10. Also provided are a head lamp holder 11 for holding a head lamp at its forward end (not shown) and a cover nut 12 which is threaded onto the threaded section 1a and which has an inwardly extending flange portion at its top end.

In such a prior art head parts assembly, while the front fork pipe 1 is repetitively rotated back and forth relative to the head pipe 6, the top outer ring 7 may move from the set position thereby causing wandering of the rotating axis of the front fork pipe 1, which is disadvantageous in steering performance. Furthermore, any vibration imparted to the top outer ring 7 may also cause slackening of the whole assembly. Besides, a long time use causes the balls of the ball bearings 8 and 9 to be worn so that the assembly would be slackened also because of this reason. In such a prior art structure, whenever the assembly becomes slackened, the top outer ring 7 must be retightened. However, since such an adjustment requires experience and skills, the head parts assembly or an entire vehicle must be brought to a repair shop or the like where skilled people are. In addition, since a small gap is usually present between the top outer and inner rings 4, 7 in the above-described prior art structure, water such as rain drops and washing water may sneak into the assembly thereby rusting the inside structure.

SUMMARY OF THE INVENTION

The disadvantages of the prior art are overcome with the present invention and an improved head parts assembly provided with a self-adjusting mechanism for preventing the assembly from becoming slacked is provided.

In accordance with one aspect of the present invention, there is provided a head parts assembly for use in a two-wheeled vehicle, comprising: a first pipe including a pair of top and bottom inner bearing surfaces; a second pipe extending through the inside of said first pipe, the outer peripheral surface of said second pipe being threaded at least partly; a pair of top and bottom outer rings provided on said second pipe and having top and bottom outer bearing surfaces opposite to said top and bottom inner bearing surfaces, respectively, at least one of said pair of top and bottom outer rings being threaded onto a threaded section of said second pipe; a pair of top and bottom bearings each provided in the space defined between said top inner and outer bearing surfaces or between said bottom inner and outer bearing surfaces; and biasing means for biasing said at least one of said pair of top and bottom outer rings to maintain each of said top and bottom bearings held between the corresponding inner and outer bearing surfaces under at least a predetermined force. Preferably, each of the bearings includes a ball bearing comprised of a plurality of balls and a ring-shaped retainer for retaining the balls in a circle spaced apart from one another. Furthermore, when only one of the top and bottom outer rings is threaded onto the threaded section of the second pipe, the other outer ring is fixedly mounted on the second pipe.

It is therefore a primary object of the present invention to provide an improved head parts assembly for use in a two-wheeled vehicle such as a bicycle or a motorbike.

Another object of the present invention is to provide a self-adjustable head parts assembly capable of preventing slackening of the parts from occurring.

A further object of the present invention is to provide a maintenance-free head parts assembly capable of offering a long service life.

A still further object of the present invention is to provide a head parts assembly of a two-wheeled vehicle which is constant in performance.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing partly in cross section the over-all structure of a typical prior art head parts assembly of a bicycle;

FIG. 2 is a schematic illustration showing partly in cross section the over-all structure of the head parts assembly embodying the present invention;

DESCRIPTION OF THE PREFERRED EMBODIMENTS

Figure 3:
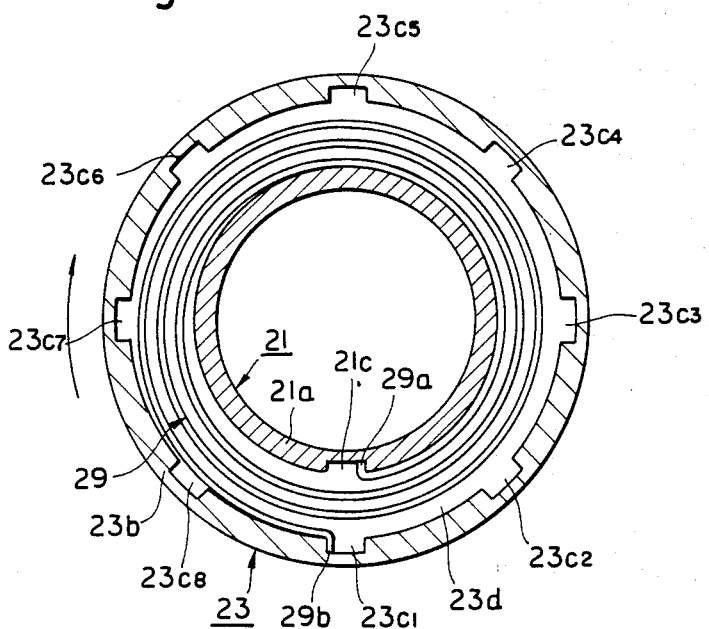
FIG. 3 is a cross sectional view taken along III—III line shown in FIG. 2.

Referring now to FIG. 2, there is shown a head parts assembly embodying the present invention, which is particularly suited to be used as a part of the frame structure of a two-wheeled vehicle such as a bicycle. As shown in FIG. 2, the present head parts assembly includes a front fork pipe 21, which is integrally connected to a fork crown 21b, from which a pair of fork legs 21c, 21c depend downwardly. The front fork pipe 21, fork crown 21b and fork legs 21c, 21c are integrally formed to define a front fork of a bicycle for rotatably supporting a front wheel (not shown). The top end portion of the front fork pipe 21 is threaded to define a threaded section 21a.

A bottom outer ring 22 having a bottom outer bearing surface 22a is fixedly fitted onto the front fork pipe 21 adjacent to the fork crown 21b. A head pipe 26 to be integrally connected to top and down pipes (not shown) of a bicycle frame is provided concentrically with the front fork pipe 21, as shown. Thus, the front fork pipe 21 extends through the interior of the head pipe 26 thereby defining a cylindrical space therebetween. A bottom inner ring 25 having a bottom inner bearing surface 25a is fixedly fitted into the bottom end portion of the head pipe 26 such that the bottom inner bearing surface 25a is generally opposite to the bottom outer bearing surface 22a to define a space therebetween, in which a ball bearing 28 is provided. The ball bearing 28 may have any well known structure and it typically comprises a plurality of balls and a retainer for retaining the balls in a circular arrangement spaced apart from each other. Thus, the bottom outer and inner bearing surfaces 22a and 25a, which are curved in shape, are in rolling contact with the balls of the ball bearing 28.

A top inner ring 24 is fixedly fitted into the top end of the head pipe 26, and it is provided with a top inner bearing surface 24a. A top outer ring 23 is provided as screwed onto the threaded section 21a of the front fork pipe 21. A top outer bearing surface 23a is formed at the bottom of the top outer ring 23 so that the outer bearing surface 23a may be located generally opposite to the inner bearing surface 24a to define a space for receiving therein another ball bearing 27, which may be of the same structure as ball bearing 28.

In the above-described structure, the front fork pipe 21 and the head pipe 26 are relatively rotatable from each other through the top and bottom ball bearings 27 and 28. Thus, by having the head pipe 26 fixedly connected to top and down pipes of a bicycle frame (not shown) and having the bottom end of a handle bar stem carrying a handle bar at its top end fixedly fitted into the front fork pipe 21 from above, a front wheel (not shown) rotatably supported by the fork legs 21c, 21c may be directed in a desired direction by manipulating the handle bar.

As best shown in FIG. 3, the top end face of the top outer ring 23 is formed with a recess 23d in which is received a coiled spring 29. One end 29a of the spring 29 is bent inwardly and the inwardly bent end 29a is engaged in an inner groove formed on the outer threaded section 21a extending in the longitudinal direction of the front fork pipe 21. The other end 29b of the spring 29 is bent outwardly and the outwardly bent end 29b is in engagement with one of eight outer grooves $23c_1-23c_8$ formed spaced apart from each other in a peripheral wall 23b of the top outer ring 23. With such a structure, the top outer ring 23 is normally biased by the spring 29 to tend to rotate in the clockwise direction as indicated by the arrow in FIG. 3 with respect to the threaded portion 21a of the front fork pipe 21. As a result, the present head parts assembly is prevented from being slackened at all times. Furthermore, even if the ball bearings 27, 28 and/or the bearing surfaces 22a, 23a, 24a and 25a are worn, no gap will be produced, and these bearing surfaces may be maintained properly in rolling contact with the corresponding ball bearings since the top outer ring 23 will be rotated as urged by the spring 29 to absorb any gap which would otherwise be created due to wear. Such a self-adjusting function of the present invention is particularly advantageous because it allows to provide a maintenance-free head parts assembly. It should be understood that any appropriate number of inner and outer grooves may be provided.

Returning to FIG. 2, also provided as screwed onto the threaded section 21a is an intermediate nut 30. It is to be noted that, as different from the prior art structure shown in FIG. 1, the intermediate nut 30 is located away from the top outer ring 23 and also from the spring 29. As understood, such an arrangement is important for the self-adjusting mechanism of the present invention to be fully operative. A cup-shaped cover 31 of, preferably, resin sits on the intermediate nut 30, and its mouth portion 31a is in sliding contact with the peripheral surface of the top inner ring 24. Accordingly, the self-adjusting mechanism of the present invention, together with the top ball bearing 27, is completely enclosed. Preferably, the inside diameter A of the mouth portion 31a is made smaller than the outside diameter of the top inner ring 24 at its top.

On the cover 31 is placed a washer 32, and a stopper nut 33 is provided as screwed onto the threaded section 21a against the intermediate nut 30 with the cover 31 and the washer 32 sandwiched therebetween under pressure. The washer 32 is, preferably, provided with an inwardly extending projection (not shown) which is engageable with the inner groove 21c.

Figure 4:
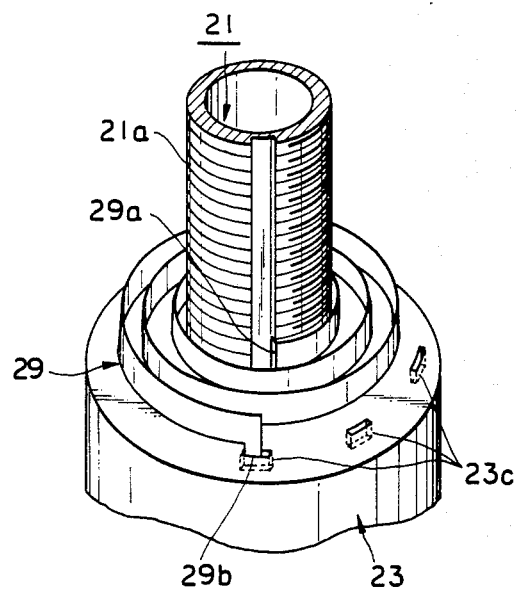
FIG. 4 is a perspective view showing the main portion of another embodiment of the present invention.

FIG. 4 shows another embodiment of the present invention. In this case, no recess is formed at the top end face of the top outer ring 23 as different from the embodiment shown in FIG. 3. In the embodiment of FIG. 4, a plurality of outer grooves 23c are formed in the top end face of the top outer ring 23 in a circular arrangement. In connection therewith, the outer end 29b of the spring 29 is formed with a sidewise projection which is engageable with one of the grooves 23c. It will be easily appreciated that this second embodiment functions in the same manner as the previously described first embodiment.

Figure 5:
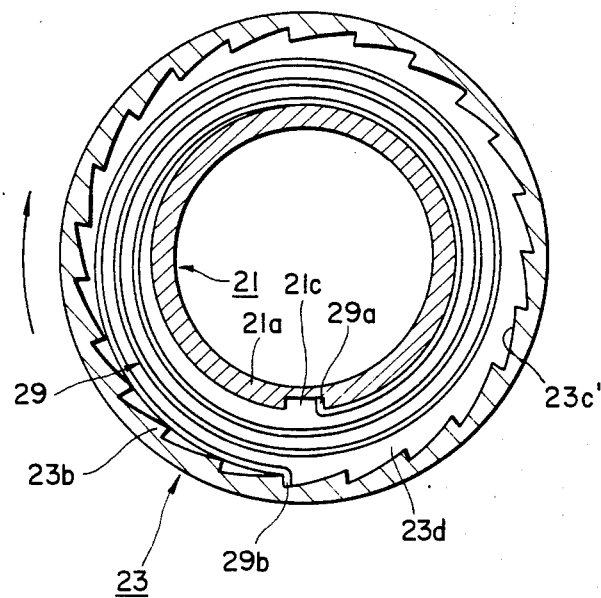
FIG. 5 is a cross sectional view showing a further embodiment of the present invention.

FIG. 5 shows a further embodiment of the present invention, which is structurally similar to the embodiment of FIG. 3. In this embodiment, instead of the grooves $23c_1$–$23c_8$ in the embodiment of FIG. 3, the inner peripheral surface 23c' of the wall 23b is formed in the shape of serration such that the outer bent end 29b of the spring 29 may slide along the serrated inner peripheral surface 23c' of the wall 23b when the spring 29 is rotated counterclockwise, or in the direction opposite to the arrow shown in FIG. 5; whereas the outer bent end 29b comes into engagement with one of the serrations when the spring 29 is rotated clockwise with respect to the ring 23. Thus, a combination of the outer bent end 29b of the spring 29 and the serrations 23c' formed on the inner peripheral surface of the wall 23b effectively constitutes a one-way clutch mechanism.

Such a structure is particularly advantageous in assembling the present device, in particular in putting the spring 29 in position. Stated more in detail, in order to place the spring 29 in position, the inner bent end 29a is first brought into engagement with the inner groove 21c of the front fork pipe 21, and, then, the spiral spring 29 is coiled or twisted counterclockwise thereby bringing the outer bent end 29b into engagement with one of the serrations 23c' provided on the inner peripheral surface of the wall 23b, followed by the step of pushing the spring 29 with its inner bent end 29a engaged with the inner groove 21c and its outer bent end 29b engaged with one of the serrations 23c' into the recess 23d to be properly set in position. It is to be noted that the serrations 23c' may be provided only partly, around the inner circumference of wall 23 and, furthermore, any other structures which function in the same manner as the above-described serrations 23c' may be employed.

While the above provides a full and complete disclosure of the preferred embodiments of the present invention, various modifications, alternate constructions and equivalents may be employed without departing from the true spirit and scope of the invention. For example, the present head parts assembly may be used in other vehicles than bicycles. For example, the present invention may be equally applicable to motorbikes or the like. Therefore, the above description and illustration should not be construed as limiting the scope of the invention, which is defined by the appended claims.

What is claimed is:

1. A head parts assembly for use in a two-wheeled vehicle, comprising:
   a first pipe provided with a pair of top and bottom inner bearing surfaces;
   a second pipe extending through the inside of said first pipe and having an outer peripheral surface which is threaded at least partly to define a threaded section;
   a pair of top and bottom outer rings provided on said second pipe and having top and bottom outer bearing surfaces opposite to said top and bottom inner bearing surfaces, respectively, at least one of said pair of top and bottom outer rings being threaded into said threaded section;
   a pair of top and bottom bearings provided in the space defined between said top inner and outer bearing surfaces and the space defined between said bottom inner and outer bearing surfaces, respectively; and
   biasing means for biasing said at least one of said pair of top and bottom outer rings to maintain each of said top and bottom bearings held between the corresponding inner and outer bearing surfaces under pressure,
   wherein said biasing means includes a spring having a first end engaged with said second pipe and a second end engaged with said top outer ring and held in place by one of a series of grooves in the inner surface of said top outer ring thereby causing said top outer ring to tend to rotate in a predetermined direction with respect to said second pipe.

2. An assembly of claim 1, wherein each of said top and bottom bearings includes a ball bearing comprised of a plurality of balls and a ring-shaped retainer for retaining said balls in a circular arrangement.

3. An assembly of claim 2, wherein either one of said top and bottom outer rings is threaded onto said threaded section of said second pipe and the other of said top and bottom outer rings is fixedly mounted on said second pipe.

4. An assembly of claim 1, wherein said second pipe is provided with at least one inner groove engageable with said first end of said spring and said top outer ring is provided with at least one outer groove engageable with said second end of said spring.

5. An assembly of claim 1 further comprising a cover for enclosing at least said biasing means.

6. An assembly of claim 5, wherein said cover also encloses the top portion of said first pipe.

7. An assembly of claim 1, wherein said second pipe is engaged with said first end of said spring and said top outer ring is provided with a serrated section engageable with said second end of said spring, said second end being slidable along said serrated section in a direction opposite said predetermined direction and not in said predetermined direction.

8. A head parts assembly for use in a two-wheeled vehicle, comprising:
   a first pipe provided with a pair of top and bottom inner bearing surfaces;
   a second pipe extending through the inside of said first pipe and having an outer peripheral surface which is threaded at least partly to define a threaded section;

a pair of top and bottom outer rings provided on said second pipe and having top and bottom outer bearing surfaces opposite to said top and bottom inner bearing surfaces, respectively, at least one of said pair of top and bottom outer rings being threaded onto said threaded section;

a pair of top and bottom bearings provided in the space defined between said top inner and outer bearing surfaces and the space defined between said bottom inner and outer bearing surfaces, respectively; and biasing means for biasing one of said at least one of said pair of top and bottom outer rings which is threaded onto said threaded section of said second pipe to maintain each of said top and bottom bearings held between the corresponding inner and outer bearing surfaces under pressure;

wherein said biasing means includes a spring having a first end engaged with said second pipe and a second end engaged with said one of said pair of top and bottom outer rings which is threaded onto said threaded section of said second pipe and held in place by the sharp side of one of a series of serrated teeth in the inner surface of said top outer ring each of said serrated teeth containing a gentle sloping side to allow said second end to slide along said teeth and a sharp side to hold said second end thereby causing said top outer ring to tend to rotate in a predetermined direction with respect to said second pipe.

* * * * *